United States Patent
Butler, III et al.

(10) Patent No.: US 9,561,846 B2
(45) Date of Patent: Feb. 7, 2017

(54) RUDDER BIAS GAIN CHANGER

(75) Inventors: Harris K. Butler, III, Towanda, KS (US); Mihalis Veletas, Witchita, KS (US)

(73) Assignee: LEARJET INC., Wichita, KS (US)

( * ) Notice: Subject to any disclaimer, the term of this patent is extended or adjusted under 35 U.S.C. 154(b) by 408 days.

(21) Appl. No.: 14/232,408

(22) PCT Filed: Jul. 26, 2011

(86) PCT No.: PCT/US2011/045269
§ 371 (c)(1),
(2), (4) Date: Jan. 13, 2014

(87) PCT Pub. No.: WO2013/015783
PCT Pub. Date: Jan. 31, 2013

(65) Prior Publication Data
US 2014/0145029 A1    May 29, 2014

(51) Int. Cl.
*B64C 13/24*    (2006.01)
*B64C 13/28*    (2006.01)
(Continued)

(52) U.S. Cl.
CPC ........... *B64C 13/28* (2013.01); *B64C 13/24* (2013.01); *B64C 13/26* (2013.01); *B64C 13/40* (2013.01)

(58) Field of Classification Search
CPC ............ B64C 9/00; B64C 9/04; B64C 9/06; B64C 13/24; B64C 13/26; B64C 13/28; B64C 13/36
See application file for complete search history.

(56) References Cited

U.S. PATENT DOCUMENTS 2,810,300 A * 10/1957 Pigford ............... B64C 13/30
                                                        244/232
2,940,332 A    6/1960 Teague, Jr.
(Continued)

FOREIGN PATENT DOCUMENTS

CN    1154325 A    7/1997
FR    1141117 A    8/1957
(Continued)

OTHER PUBLICATIONS

Cessna Citation Soverign, Flight Controls, Section II, Airplanes and Systems, Model 680, pp. 2-48 to 2-58, presumed date Jul. 2007.
(Continued)

*Primary Examiner* — Tien Dinh
*Assistant Examiner* — Michael A Fabula
(74) *Attorney, Agent, or Firm* — Thomas & Karceski, PC

(57) ABSTRACT

A bias gain system for aircraft rudder comprises a pair of connector ends receiving an actuation force from a bias actuator. A rudder bar interface is positioned between the connector ends. The interface rotates about the rudder bar as a function of the actuation forces from the bias actuators. A mechanism comprises links and joints between the connector ends and the rudder bar is actuatable between a contracted configuration, in which first moment arms are defined between the connector ends and the rudder bar interface, and an expanded gain configuration, in which second moment arms have a greater dimension than the first moment arms. An actuator is connected to the mechanism to actuate the mechanism to actuate the mechanism independently from the actuation forces from the bias actuators, to move the mechanism between configurations. An aircraft and a method for controlling a torque on a rudder bar of an aircraft are also provided.

20 Claims, 5 Drawing Sheets

(51) Int. Cl.
  *B64C 13/26*   (2006.01)
  *B64C 13/40*   (2006.01)

(56) References Cited

U.S. PATENT DOCUMENTS

| | | | | |
|---|---|---|---|---|
| 3,160,367 | A * | 12/1964 | Lecarme | B64C 13/16 |
| | | | | 244/76 R |
| 3,696,684 | A | 10/1972 | Estlick | |
| 3,911,847 | A | 10/1975 | Worthing | |
| 3,965,798 | A * | 6/1976 | Estlick | F15B 15/06 |
| | | | | 188/303 |
| 4,318,308 | A * | 3/1982 | Monteillet | B64C 13/30 |
| | | | | 244/232 |
| 4,648,569 | A * | 3/1987 | Stewart | B64C 13/16 |
| | | | | 244/76 R |
| 6,257,528 | B1 | 7/2001 | Brislawn | |
| 7,837,144 | B2 | 11/2010 | Kothera et al. | |
| 2005/0116095 | A1 * | 6/2005 | Cline | B64C 13/42 |
| | | | | 244/99.9 |
| 2009/0090816 | A1 * | 4/2009 | Gomes | B64C 13/38 |
| | | | | 244/234 |
| 2009/0146013 | A1 * | 6/2009 | Sheahan, Jr. | B64C 13/24 |
| | | | | 244/213 |
| 2009/0159755 | A1 | 6/2009 | Gonzalez Gozalbo et al. | |
| 2010/0084506 | A1 | 4/2010 | Meinberg Macedo et al. | |

FOREIGN PATENT DOCUMENTS

| | | |
|---|---|---|
| GB | 907631 | 10/1962 |
| GB | 1086161 | 10/1967 |
| WO | WO 2010063868 A2 | 6/2010 |

OTHER PUBLICATIONS

Cessna Citation Soverign, Specification & Description, Revision B, Units 680-0184 to TBD, pp. 1-24, Jul. 2007.
Aircraft Hydraulic Systems, 3rd Edition, William A. Neese, Embry-Riddle Aeronautical University, pp. 470-471, Feb. 1991.
International Search Report and Written Opinion dated May 22, 2012 for International Patent Application No. PCT/US2011/045269.
Chinese Office Action dated Mar. 30, 2015, for Chinese Patent Application No. 201180072544.3.

* cited by examiner

RUDDER BIAS GAIN CHANGER

CROSS-REFERENCE TO RELATE APPLICATION(S)

This is a National Stage Entry into the United Stated Patent and Trademark Office from International PCT Patent Application NO. PCT/US2011/045269, having an international filing date of Jul. 26, 2011, the entire contents of which are incorporated herein by reference.

FIELD OF THE APPLICATION

The present application pertains to rudder systems for aircraft, and more particularly to a gain system for controlling the torque transmitted to the aircraft rudder.

BACKGROUND OF THE ART

Rudders are commonly used at the tails of aircraft to control the yaw orientation of the aircraft, for instance in combination with elevators. The rudder consists of a panel that is mounted to the tail of the aircraft. The rudder is pivoted about a generally upright axis by way of a rudder bar, so as to project partially out of a centerline of the aircraft. As a result, the drag forces caused by the displacement of the rudder will affect the yaw orientation of the aircraft.

In some very specific instances, there may be required a greater out-of-centerline orientation of the rudder. For instance, during the takeoff phase, it may occur that one of the engines of the aircraft shuts off. In such cases, the aircraft does not have sufficient velocity to oppose sufficient rudder drag forces against the one-sided thrust of the remaining operative engine. In such cases, it may be required to increase the out-of-centerline orientation of the rudder to compensate for the thrust being on a single side of the aircraft. However, once the aircraft is airborne, it may not be necessary to maintain as much of this out-of-centerline orientation, considering that the velocity of the aircraft is high enough to control the aircraft with normal out-of-centerline orientation of the rudder.

In other instance, it may be required to increase the blow down limit of the rudder. In these instances, the actuator forces controlling the rotation of the rudder have reached their maximum limit, and cannot increase the angle of the rudder. The blow down limit may be reached with high headwinds.

SUMMARY OF THE APPLICATION

It is therefore an aim of the present disclosure to provide a rudder bias gain system addressing issues associated with the prior art.

It is a further aim of the present disclosure to provide a rudder bias gain system to modify moment-arm distances for torque applied on a rudder bar.

It is a still further aim of the present disclosure to provide a method for modifying moment-arm distances for torque applied on a rudder bar.

Therefore, in accordance with a first embodiment, there is provided a bias gain system for aircraft rudder, comprising: a pair of connector ends, each said connector end adapted to receive an actuation force from a respective bias actuator; a rudder bar interface positioned between the connector ends and adapted to be connected to a rudder bar for rotation therewith about an axis of the rudder bar as a function of the actuation forces from the bias actuators; a mechanism comprising links and joints between the connector ends and the rudder bar for transmission of the actuation forces to the rudder bar, the mechanism being actuatable between a contracted configuration in which first moment arms are defined between the connector ends and the rudder bar interface, and an expanded gain configuration in which second moment arms are defined between the connector ends and the rudder bar interface, the second moment arms having a greater dimension than the first moment arms; and at least one actuator connected to the mechanism to actuate the mechanism independently from the actuation forces from the bias actuators so as to move the mechanism between the contracted configuration and the expanded gain configuration.

Further in accordance with the first embodiment, the mechanism comprises a crank link, the rudder bar interface being at a first end of the crank link such that the crank link is adapted to rotate concurrently with the rudder bar about said axis of the rudder bar.

Still further in accordance with the first embodiment, a pair of scissor links, each connected to one of the connector ends at a free end, are rotatably connected to a second end of the crank link by at least a rotational joint so as to be displaced away from the crank arm in the expanded gain configuration of the mechanism by actuation of the at least one actuator.

Still further in accordance with the first embodiment, the scissor links rotate about a common axis at the second end of the crank link.

Still further in accordance with the first embodiment, a pair of gain links between the at least one actuator and the scissor links transmit an actuation of the at least one actuator to the scissor links to configure the mechanism to the contracted configuration and the expanded gain configuration.

Still further in accordance with the first embodiment, the gain links are connected to the at least one actuator and to the scissor links by rotational joints.

Still further in accordance with the first embodiment, the gain links rotate about a common axis at their junction with the at least one actuator.

Still further in accordance with the first embodiment, the at least one actuator is a linear actuator secured to the crank link.

Still further in accordance with the first embodiment, the crank link has a pair of lateral arms extending toward a respective one of the scissor links, and further comprising a sliding joint between each set consisting of one of the lateral arms and a respective one of the scissor links.

Still further in accordance with the first embodiment, the rudder bar interface comprises a bore with an engagement peripheral pattern adapted to operatively engage with the rudder bar for concurrent rotation.

Still further in accordance with the first embodiment, the connector ends are adapted to define a rotational joint with the respective bias actuators.

Still further in accordance with the first embodiment, the rudder bar interface is located at a fore end of the mechanism relative to an orientation of an aircraft consistently with a travel direction of the aircraft.

In accordance with a second embodiment, there is provided an aircraft comprising: a structural element; a rudder rotatably mounted to the aircraft structural element by a rudder bar so as to pivot about an axis of the rudder bar; at least a pair of bias actuators connected to the aircraft structural element;

and a bias gain system comprising a pair of connector ends, each said connector end receiving an actuation force from a respective one of the bias actuators; a rudder bar interface positioned between the connector ends and connected to the rudder bar for rotation therewith about the axis of the rudder bar as a function of the actuation forces from the bias actuators; a mechanism comprising links and joints between the connector ends and the rudder bar for transmission of the actuation forces to the rudder bar, the mechanism being actuatable between a contracted configuration in which first moment arms are defined between the connector ends and the rudder bar interface, and an expanded gain configuration in which second moment arms are defined between the connector ends and the rudder bar interface, the second moment arms having a greater dimension than the first moment arms; and at least one actuator connected to the mechanism to actuate the mechanism independently from the actuation forces from the bias actuators so as to move the mechanism between the contracted configuration and the expanded gain configuration.

Further in accordance with the second embodiment, the mechanism comprises a crank link, the rudder bar interface being at a first end of the crank link such that the crank link rotates concurrently with the rudder bar about said axis of the rudder bar.

Still further in accordance with the second embodiment, a pair of scissor links, each connected to one of the connector ends at a free end, are rotatably connected to a second end of the crank link by at least a rotational joint so as to be displaced away from the crank arm in the expanded gain configuration of the mechanism by actuation of the at least one actuator.

Still further in accordance with the second embodiment, the scissor links rotate about a common axis at the second end of the crank link.

Still further in accordance with the second embodiment, a pair of gain links between the at least one actuator and the scissor links transmit an actuation of the at least one actuator to the scissor links to configure the mechanism to the contracted configuration and the expanded gain configuration.

Still further in accordance with the second embodiment, the gain links are connected to the at least one actuator and to the scissor links by rotational joints.

Still further in accordance with the second embodiment, the gain links rotate about a common axis at their junction with the at least one actuator.

Still further in accordance with the second embodiment, the at least one actuator is a linear actuator secured to the crank link.

Still further in accordance with the second embodiment, the crank link has a pair of lateral arms extending toward a respective one of the scissor links, and further comprising a sliding joint between each set consisting of one of the lateral arms and a respective one of the scissor links.

Still further in accordance with the second embodiment, the rudder bar interface comprises a bore with an engagement peripheral pattern adapted to operatively engage with the rudder bar for concurrent rotation.

Still further in accordance with the second embodiment, the connector ends define a rotational joint with the respective bias actuators.

Still further in accordance with the second embodiment, the rudder bar interface is located at a fore end of the mechanism relative to an orientation of the aircraft consistently with a travel direction of the aircraft.

In accordance with a third embodiment, there is provided a method for controlling a torque on a rudder bar of an aircraft, comprising: receiving actuation forces on opposed ends of a mechanism to cause a rotation of a rudder bar positioned between the opposed ends of the mechanism; and modifying a configuration of the mechanism independently of the actuation forces to change moment-arm distances between the opposed ends of the mechanism and the rudder bar.

Further in accordance with the third embodiment, receiving actuation forces comprises receiving two actuation forces in opposite directions.

Still further in accordance with the third embodiment, modifying the configuration of the mechanism comprises modifying the configuration of the mechanism with a single degree of actuation.

Still further in accordance with the third embodiment, modifying the configuration comprises expanding the mechanism by displacing a pair of scissor links away from one another and away from a crank link so as to increase moment-arm distances between the respective opposed ends of the mechanism and the rudder bar.

Still further in accordance with the third embodiment, modifying the configuration comprises contracting the mechanism by displacing a pair of scissor links toward the crank link so as to reduce moment-arm distances between the respective opposed ends of the mechanism and the rudder bar.

Still further in accordance with the third embodiment, expanding the mechanism is performed during a takeoff phase of a flight of the aircraft.

BRIEF DESCRIPTION OF DRAWINGS

For a better understanding of the present invention, as well as other aspects and further features thereof, reference is made to the following description which is to be used in conjunction with the accompanying drawings, where.

DESCRIPTION OF PREFERRED EMBODIMENTS

Figure 1:
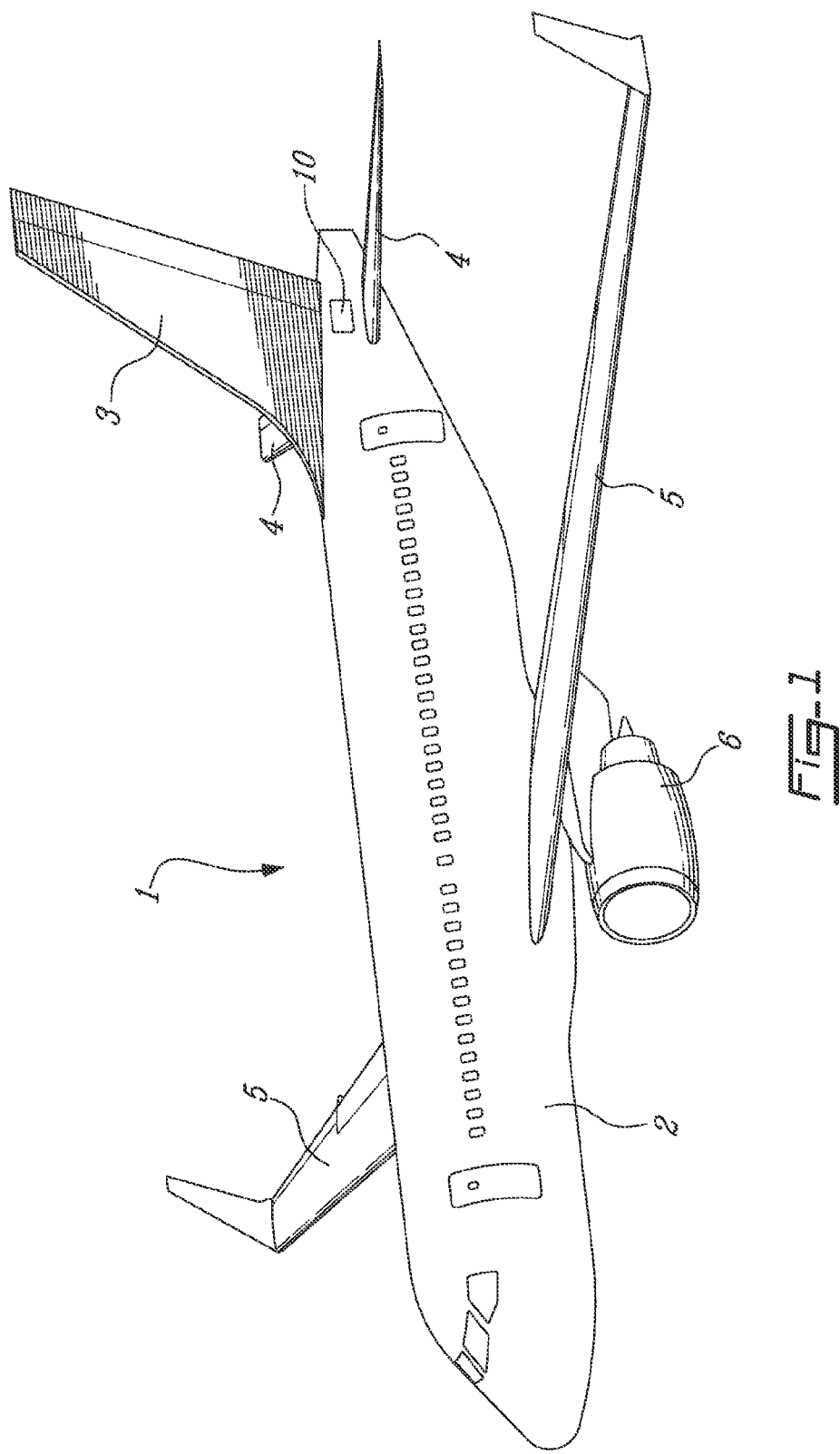
FIG. 1 is a schematic isometric view of an aircraft featuring a bias gain system of the present disclosure.

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The fore end and the aft end are defined consistently with a travel direction of the aircraft 1. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5 (one shown), although the engines 6 could also be mounted to the fuselage 2 or at any other appropriate location on the aircraft. The aircraft 1 is shown as a jet-engine aircraft, but may also be a propeller aircraft.

Figure 2:
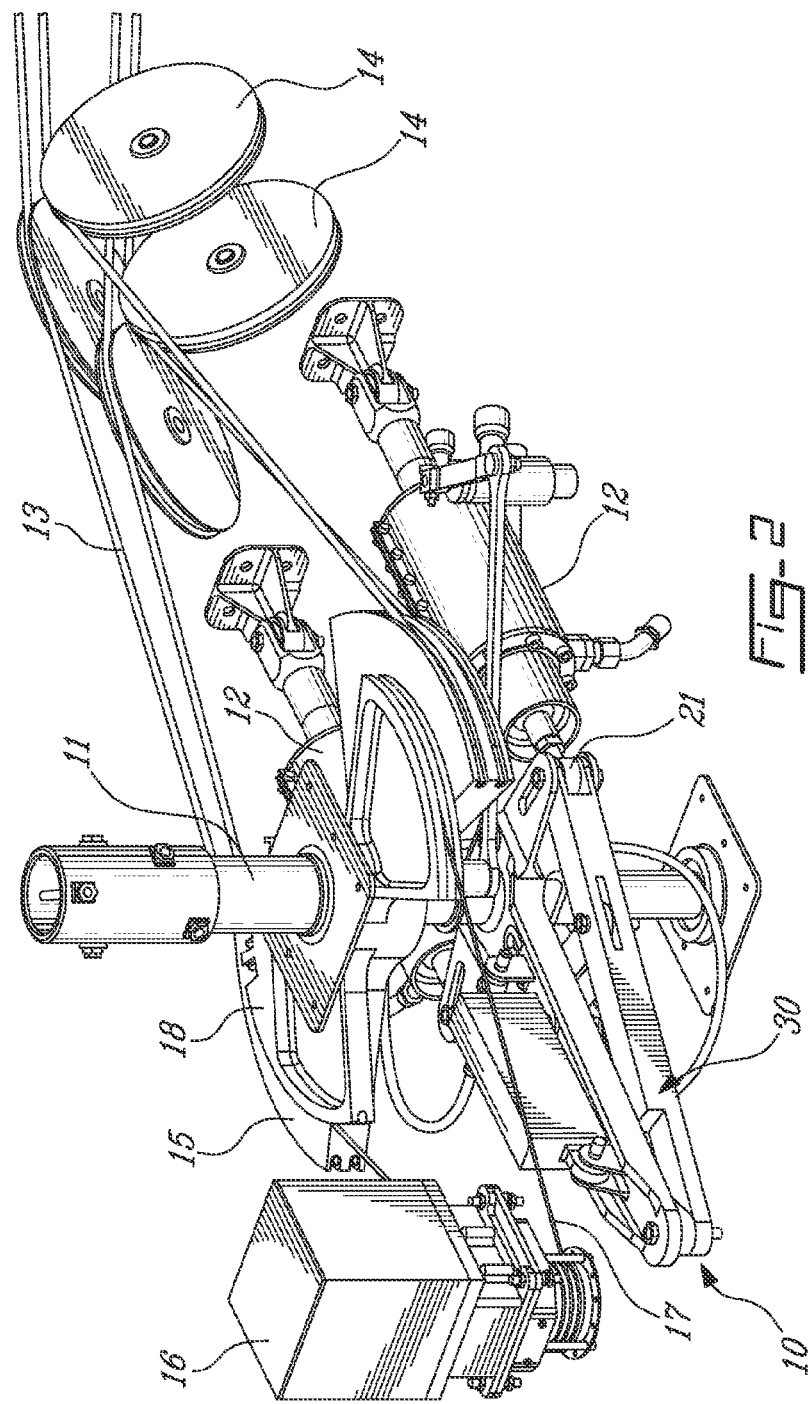
FIG. 2 is a perspective view of the bias gain system in accordance with an embodiment of the present disclosure, relative to other aircraft systems.

Referring to the drawings, and more particularly to FIGS. 1 and 2, a rudder bias gain system in accordance with the present disclosure is generally shown at 10. The bias gain system 10 may be located within the fuselage 2 (FIG. 1) and is used to actuate a rotation of the rudder of the tail assembly, by being interfaced to a rudder bar. The bias gain system 10 is illustrated relative to various aircraft components, such as the rudder bar 11. The rudder bar 11 rotates about its longitudinal axis to adjust an orientation of a rudder of the aircraft. Although not shown, the rudder is connected to the rudder bar 11, for concurrently rotating with the rudder bar 11. The longitudinal axis of the rudder bar 11 is generally upright relative to the aircraft.

Bias actuators 12 are connected to the bias gain system 10 to actuate the rotation of the rudder bar about its longitudinal axis. For illustrative purposes, other aircraft systems are shown as well, but are not necessarily present when the bias gain system 10 is on an aircraft. For instance, FIG. 2 shows a cable control system featuring cables 13 and pulleys 14. For simplicity purposes, the pulleys 14 are schematically illustrated without any supports in FIG. 2. The cables will actuate a rotation of the quadrant 15. The quadrant 15 is integral with the rudder bar 11, such that tension on the cables 13 will cause a rotation of the rudder bar 11 about its longitudinal axis, and thus cause a rotation of the rudder. The cable control system may either be the primary system for actuating a rotation of the rudder bar 11, or a back-up system.

Also shown in FIG. 2 is a damper servo 16. The damper servo 16 is connected to the rudder bar 11 by way of a cable 17 and quadrant 18, whereby any actuation may be transmitted from the damper servo 16 to the rudder.

Figure 3:
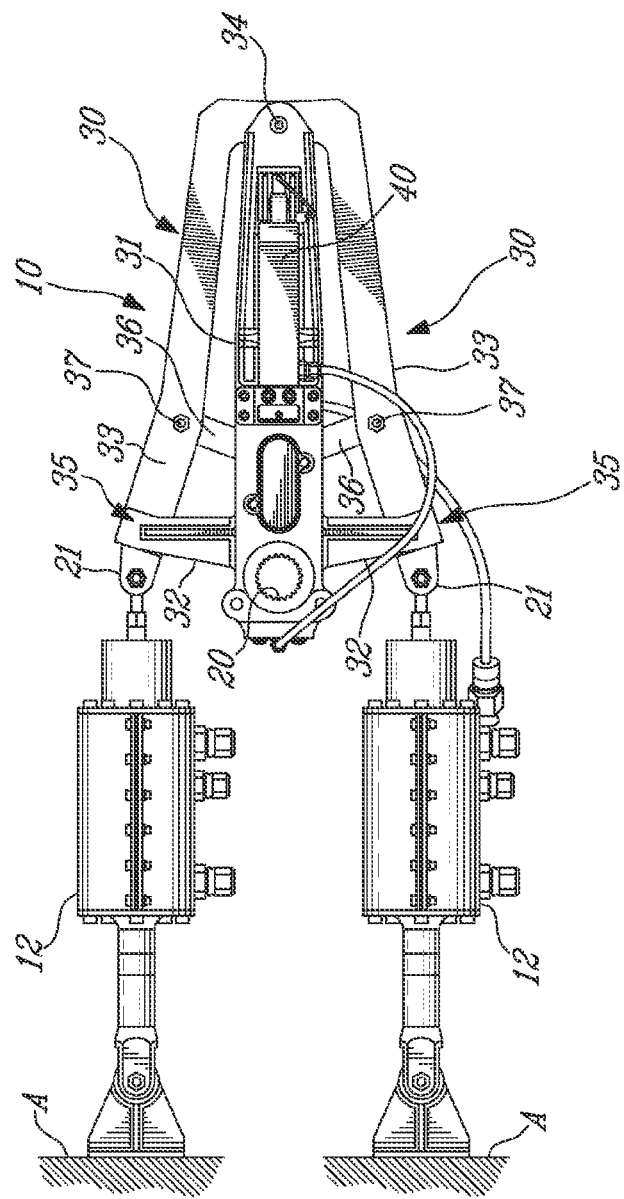
FIG. 3 is a top plan view of the bias gain system of FIG. 2 with bias actuators.
Figure 4:
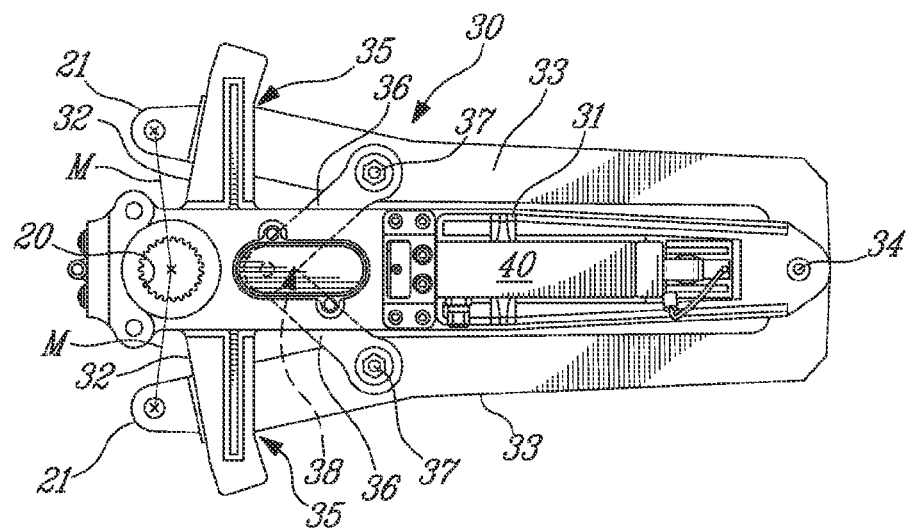
FIG. 4 is a top plan view of the bias gain system of FIG. 2 in a contracted configuration.

Referring concurrently to FIGS. 2-4, the bias gain system 10 is shown in a plane view. In FIG. 3, the bias gain system 10 is connected to the pair of bias actuators 12. The bias actuators 12 may be pneumatic cylinders having an output piston (e.g., a piston with a shaft or arm projecting out of casing of the cylinder). A displacement of the output piston will cause a pivoting movement of the bias gain system 10 about a longitudinal axis of the rudder bar 11, which longitudinal axis is normal to a plane of FIGS. 2-4. The bias actuators 12 are secured to a structure of the aircraft A by way of rotational joints.

The bias gain system 10 has a rudder bar interface 20. The rudder bar interface 20 may be a splined or toothed opening through which the rudder bar is threaded. Any appropriate configuration of the rudder bar interface 20 may be used in the bias gain system 10. For instance, other engagement peripheral patterns may be used as alternatives to the splined or toothed configurations.

The bias gain system 10 also has a pair of connector ends 21. The connector ends 21 are interfaced to the piston of the actuators 12. Typically, a rotational joint is formed between the connector ends 21 and the output piston of the bias actuators 12. For instance, a clevis configuration could be used.

The rudder bar interface 20 and the connector ends 21 are interconnected by a mechanism 30 of the bias gain system 10. The mechanism 30 consists of links and joints actuatable between the contracted configuration of FIG. 4 and the expanded gain configuration of FIG. 5. One possible configuration of the mechanism 30 is described hereinafter, but other configurations are possible as well.

In the illustrated embodiment, the mechanism 30 has a crank link 31. The crank link 31 is described as having a fore end and an aft end, in accordance with the fore end and the aft end of the aircraft of FIG. 2, and further in accordance with an embodiment of the present disclosure. However, the crank link 31 may have any suitable orientation, but reference is made hereafter to fore end and aft end of the crank link 31 in accordance with the illustrated embodiment, and to simplify the description. The crank link 31 has at a fore end a support for the rudder bar interface 20. Adjacent to the fore end are a pair of arms 32, giving the crank link 31 a T shape. A pair of scissor links 33 are provided on either sides of the crank link 31 and are connected to an aft end of the crank link 31 by way of a rotational joint 34. Accordingly, the scissor links 33 may rotate relative to the crank link 31 and, more specifically, about an axis of the rotational joint 34, which axis is normal to a plane of FIGS. 2-4.

Sliding joints 35 are formed between the arms and the scissor links 33. The scissor links 33 perform an arcuate path of motion when moving from the contracted configuration to the expanded gain configuration, whereby this motion is defined by the sliding joints 35. The connector ends 21 of the bias gain system 10 are positioned at fore ends of the scissor links 33, whereby forces of the bias actuators 12 are transmitted to the mechanism 30 via the scissor links 33. Thus, the sliding joints 35 have a certain level of structural integrity so as to help transfer forces from the actuators 12 to the crank arm 32. Therefore, the sliding joints 35 are able to sustain a given level of pressure.

Gain links 36 are provided to transmit an actuation movement to the scissor links 33 so as to expand or contract the bias gain system 10. The gain links 36 have at lateral ends rotational joints 37 by which they are connected to the scissor links 33. In an embodiment, a single rotational joint 38 is provided at ends of both the gain links 36, whereby the gain links 36 may rotate about a common axis. This common axis of the rotational joint 38 is typically normal to a plane of FIGS. 2-4.

The rotational joint 38 is secured to an output piston of actuator 40. The actuator 40 extends along the crank link 31 so as to be integral therewith. A casing of the actuator 40 is therefore immovable relative to the crank link 31, while an output piston is displaceable by way of an electrical actuator along a longitudinal axis of the crank link 31. In an alternative embodiment, the output piston is displaceable by way of a piston and pneumatic or hydraulic actuation along a longitudinal axis of the crank link 31.

Figure 5:
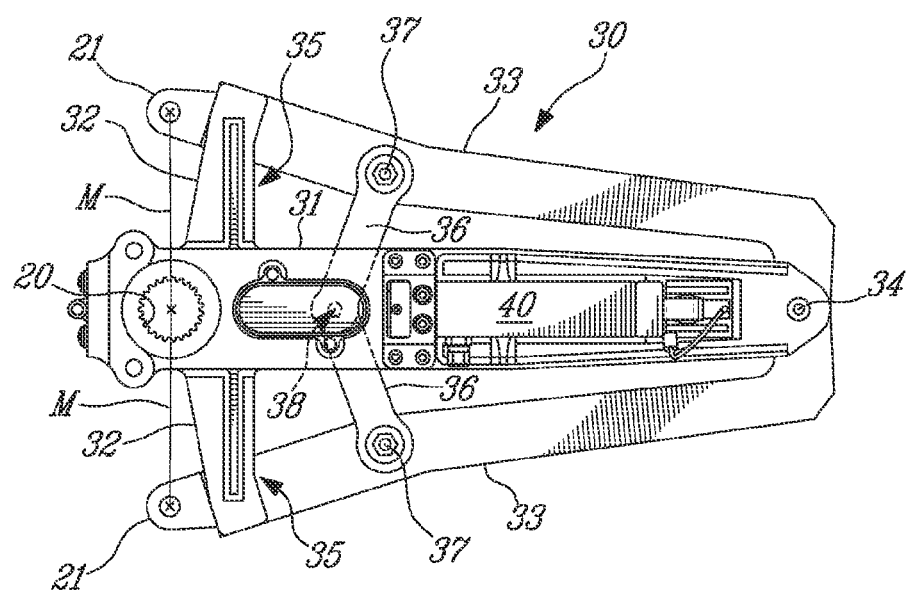
FIG. 5 is a top plan view of the bias gain system of FIG. 2 in an expanded gain configuration.

Therefore, a displacement of the output piston of the actuator 40 from the position of FIG. 4 to the position of FIG. 5 will bring the rotational joint 38 to an aftmost position. As a result, the gain links 36 will move laterally outward at their lateral ends, causing the scissor links 33 to move to the expanded gain configuration. Therefore, the moment arms, illustrated as M in FIGS. 3 and 4, are increased by the movement of the scissor links to the expanded gain configuration. As known in the art, the moment arms are the straight-line distance between the point of application of the force, namely the connection ends 21, and a center of rotation of the rudder bar 11. The moment arms are therefore visibly shown as having increased and, therefore, being of greater dimension in FIG. 5 over FIG. 4. Accordingly, for a same actuation of the bias actuators 12, the torque will be greater in the expanded gain configuration of FIG. 5, as the moment arm is of greater dimension than the moment arm of the contracted configuration of FIG. 4.

It is observed that the bias actuators 12 may operate in opposite directions. More specifically, while one of the bias actuators 12 has its output piston moved aft, the other bias actuator 12 typically has the output piston moved fore.

Figure 6:
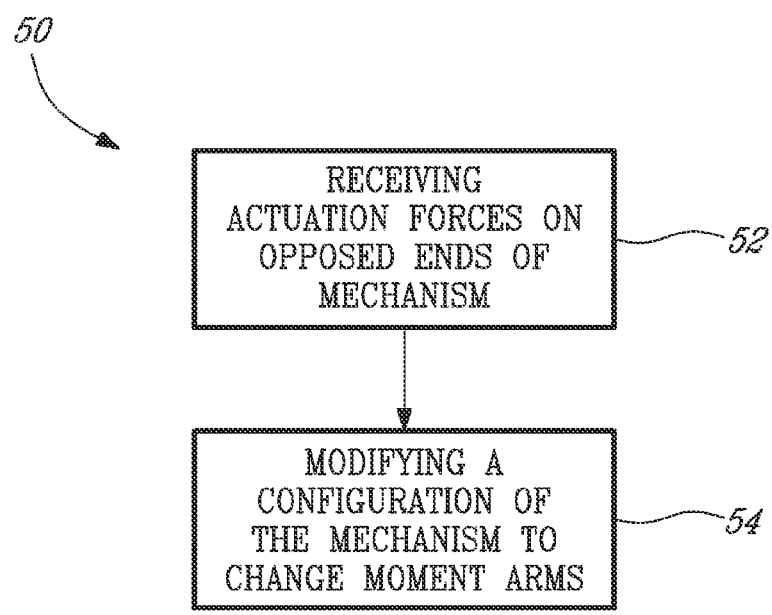
FIG. 6 is a flowchart of a method for increasing a torque on a rudder bar of an aircraft.

Now that the bias gain system 10 of the present disclosure has been described by reference to one possible embodiment, a method of controlling a torque on a rudder bar is now described with reference to FIG. 6. According to method 50 of FIG. 6, a first step 52 consists in receiving actuation forces on opposed ends of a mechanism, such as the mechanism 30. As a result, a rotation of the rudder bar will be caused.

According to a second step 54, a configuration of the mechanism 30 is modified. The configuration is modified to change moment-arm distances between the opposed ends of the mechanism and the rudder bar, independently from the actuation forces on the opposed ends of the mechanism 30 that rotate the rudder bar 11. As a possibility, the mechanism 30 expands from the contracted configuration of FIG. 4 to the expanded gain configuration of FIG. 5. The moment arm distance M between the opposed ends of the mechanism 30 and the rudder bar 11 will both increase as a result of the expansion.

As another possibility, the mechanism 30 contracts from the expanded gain configuration of FIG. 5 to the contracted configuration of FIG. 4. The moment arm distance M between the opposed ends of the mechanism 30 and the rudder bar 11 will both decrease as a result of the contraction.

Therefore, upon receiving further actuation forces, the moment arm distance will be increased or decreased, thereby causing an increase or decrease in torque applied to the rudder bar for the same actuation forces. The expansion of the mechanism 30 to the expanded gain configuration may for instance be used in the takeoff phase of a flight of the aircraft, for instance when the aircraft does not have sufficient velocity to oppose sufficient rudder drag forces to uneven thrust, such as a one-sided thrust of the remaining operative engine. In such a case, the mechanism 30 returns to the contracted configuration when sufficient velocity is reached. The modification of configuration of the mechanism 30 may occur at any appropriate moment of a flight of the aircraft.

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present invention.

It is observed that a center line of the mechanism 30 (i.e., passing through the center of rotation of the rudder bar interface 20 and the center of the rotational joint 34) is an axis of symmetry for the mechanism 30. Therefore, while not being a requirement of the rudder bias gain system, the symmetry of the mechanism 30 may facilitate the control of the forces applied to the rudder bias gain system 10. Moreover, the mechanism 30 may be sized such that the scissor links 33 move concurrently symmetrically relative to the crank link 31. The symmetry results in the moment arm distances M on either side of the crank link 31 being equal, whether in the contracted configuration (FIG. 4), or the expanded gain configuration (FIG. 5). Other arrangements are also possible.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A bias gain system for aircraft rudder, comprising:
   a pair of bias actuators;
   a pair of connector ends, each of said connector ends receiving an actuation force from a respective one of the bias actuators;
   a rudder bar;
   a rudder bar interface positioned between the connector ends and connected to the rudder bar for rotation therewith about an axis of the rudder bar as a function of the actuation forces from the bias actuators;
   a mechanism comprising links and joints between the connector ends and the rudder bar for transmission of the actuation forces to the rudder bar, the mechanism being actuated between a contracted configuration in which first moment arms are defined between the connector ends and the rudder bar interface, and an expanded gain configuration in which second moment arms are defined between the connector ends and the rudder bar interface, the second moment arms having a greater dimension than the first moment arms; and
   at least one actuator connected to the mechanism to actuate the mechanism independently from the actuation forces from the bias actuators so as to move the mechanism between the contracted configuration and the expanded gain configuration.

2. The bias gain system according to claim 1, wherein the mechanism comprises a crank link, the rudder bar interface being at a first end of the crank link such that the crank link rotates concurrently with the rudder bar about said axis of the rudder bar.

3. The bias gain according to claim 2, further comprising first and second scissor links each being connected to a respective one of the connector ends, the first and second scissor links being rotatably connected to a second end of the crank link by at least a rotational joint so as to be displaced away from the crank link in the expanded gain configuration of the mechanism by actuation of the at least one actuator.

4. The bias gain system according to claim 3, wherein the first and second scissor links rotate about a common axis at the second end of the crank link.

5. The bias gain system according to claim 4, further comprising first and second gain links disposed between the at least one actuator and the first and second scissor links, the first and second gain links transmitting an actuation of the at least one actuator to the first and second scissor links to configure the mechanism to the contracted configuration and the expanded gain configuration.

6. The bias gain system according to claim 5, wherein the first and second gain links are connected to the at least one actuator at a junction and the first and second gain links connect to the first and second scissor links by first and second rotational joints, respectively.

7. The bias gain system according to claim 6, wherein the first and second gain links rotate about a common axis at the junction with the at least one actuator.

8. The bias gain system according to claim 3, wherein:
   the crank link has first and second lateral arms each extending toward a respective one of the first and second scissor links, and
   a sliding joint is disposed between each one of the first and second lateral arms and a respective one of the first and second scissor links.

9. The bias gain system according to claim 2, wherein the at least one actuator is a linear actuator secured to the crank link.

10. The bias gain system according to claim 1, wherein the rudder bar interface comprises:
   a bore with an engagement peripheral pattern operatively engaging the rudder bar for concurrent rotation.

11. The bias gain system according to claim 1, wherein each of the connector ends define a respective rotational joint with one of the bias actuators.

12. The bias gain system according to claim 1, wherein the rudder bar interface is located at a fore end of the mechanism relative to an orientation of an aircraft defined consistently with a flight direction of the aircraft.

13. A method for controlling a torque on a rudder bar of an aircraft having the bias gain system of claim 1, comprising:
   receiving actuation forces on opposed ends of the mechanism to cause a rotation of the rudder bar positioned between the opposed ends of the mechanism; and
   modifying a configuration of the mechanism independently of the actuation forces to change moment-arm distances between the opposed ends of the mechanism and the rudder bar.

14. The method according to claim 13, wherein receiving the actuation forces comprises receiving two actuation forces in opposite directions.

15. The method according to claim 13, wherein modifying the configuration of the mechanism comprises modifying the configuration of the mechanism with a single degree of freedom.

16. The method according to claim 13, wherein the mechanism comprises a crank link, the rudder bar interface being at a first end of the crank link such that the crank link rotates concurrently with the rudder bar about said axis of the rudder bar and the bias gain system further comprises first and second scissor links each being connected to a respective one of the connector ends, the first and second scissor links being rotatably connected to a second end of the crank link by at least a rotational joint so as to be displaced away from a crank arm in the expanded gain configuration of the mechanism by actuation of the at least one actuator, and wherein modifying the configuration comprises expanding the mechanism by displacing the pair of scissor links away from one another and away from the crank link so as to increase moment-arm distances between the respective opposed ends of the mechanism and the rudder bar.

17. The method according to claim 16, wherein expanding the mechanism is performed during a takeoff phase of a flight of the aircraft.

18. The method according to claim 13, wherein the mechanism comprises a crank link, the rudder bar interface being at a first end of the crank link such that the crank link rotates concurrently with the rudder bar about said axis of the rudder bar and the bias gain system further comprises first and second scissor links each being connected to a respective one of the connector ends, the first and second scissor links being rotatably connected to a second end of the crank link by at least a rotational joint so as to be displaced away from a crank arm in the expanded gain configuration of the mechanism by actuation of the at least one actuator, and wherein modifying the configuration comprises contracting the mechanism by displacing the pair of scissor links toward the crank link so as to reduce moment-arm distances between the respective opposed ends of the mechanism and the rudder bar.

19. An aircraft comprising:
   a structural element;
   a rudder bar;
   a rudder rotatably mounted to the structural element by the rudder bar so as to pivot about an axis of the rudder bar;
   at least a pair of bias actuators connected to the structural element; and
   a bias gain system comprising:
      a pair of bias actuators;
      a pair of connector ends, each said connector end receiving an actuation force from a respective one of the bias actuators;
      a rudder bar interface positioned between the connector ends and connected to the rudder bar for rotation therewith about the axis of the rudder bar as a function of the actuation forces from the bias actuators;
      a mechanism comprising links and joints between the connector ends and the rudder bar for transmission of the actuation forces to the rudder bar, the mechanism being actuated between a contracted configuration in which first moment arms are defined between the connector ends and the rudder bar interface, and an expanded gain configuration in which second moment arms are defined between the connector ends and the rudder bar interface, the second moment arms having a greater dimension than the first moment arms; and
      at least one actuator connected to the mechanism to actuate the mechanism independently from the actuation forces from the bias actuators so as to move the mechanism between the contracted configuration and the expanded gain configuration.

20. The aircraft according to claim 19, wherein the mechanism comprises a crank link, the rudder bar interface being at a first end of the crank link such that the crank link rotates concurrently with the rudder bar about said axis of the rudder bar.

* * * * *

UNITED STATES PATENT AND TRADEMARK OFFICE
CERTIFICATE OF CORRECTION

PATENT NO. : 9,561,846 B2  
APPLICATION NO. : 14/232408  
DATED : February 7, 2017  
INVENTOR(S) : Butler, III et al.

Page 1 of 1

It is certified that error appears in the above-identified patent and that said Letters Patent is hereby corrected as shown below:

On the Title Page

At item (75), the listing of the Inventors is corrected to add Mr. James D. Hawkins, so that the listing of inventors reads as follows:
(75) Inventors: Harris K. Butler, III, Towanda, KS (US);
Mihalis Veletas, Wichita, KS (US);
James D. Hawkins, Wichita, KS (US)

Signed and Sealed this
Twentieth Day of February, 2018

Andrei Iancu
*Director of the United States Patent and Trademark Office*